(12) United States Patent
Laird-McConnell et al.

(10) Patent No.: US 7,949,658 B2
(45) Date of Patent: May 24, 2011

(54) RICH CLIENT SEARCH EXPERIENCE

(75) Inventors: Tom Laird-McConnell, Bellevue, WA (US); Steve Ickman, Bellevue, WA (US); Brandon Paddock, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 412 days.

(21) Appl. No.: 12/044,632

(22) Filed: Mar. 7, 2008

(65) Prior Publication Data

US 2009/0228515 A1   Sep. 10, 2009

(51) Int. Cl.
    *G06F 17/30* (2006.01)
(52) U.S. Cl. ......... 707/731; 707/705; 707/706; 707/708
(58) Field of Classification Search .................. 707/705, 707/706, 707, 752, 731
    See application file for complete search history.

(56) References Cited

U.S. PATENT DOCUMENTS

| | | | |
|---|---|---|---|
| 6,976,018 B2 | 12/2005 | Teng et al. | |
| 2003/0043144 A1* | 3/2003 | Pundarika et al. | 345/419 |
| 2003/0177111 A1 | 9/2003 | Egendorf et al. | |
| 2005/0076016 A1 | 4/2005 | Mihai et al. | |
| 2005/0086204 A1 | 4/2005 | Coiera et al. | |
| 2005/0177303 A1 | 8/2005 | Han | |
| 2006/0106763 A1 | 5/2006 | Dirisala | |
| 2006/0167864 A1* | 7/2006 | Bailey et al. | 707/3 |
| 2006/0195421 A1 | 8/2006 | Kilroy | |
| 2007/0106638 A1 | 5/2007 | Subramaniam et al. | |
| 2007/0192703 A1* | 8/2007 | Unz | 715/733 |
| 2007/0198451 A1 | 8/2007 | Kehlenbeck et al. | |
| 2007/0219979 A1 | 9/2007 | Jung et al. | |

OTHER PUBLICATIONS

High Earth Orbit, "OpenSearch Geo and Time Extensions," Oct. 16, 2007, 3 pages, http://highearthorbit.com/opensearch-geo-and-time-extensions/.
Snellspace.com, "URI Templates in XML," Oct. 4, 2006, pp. 1-4, http://www.snellspace.com/wp/?cat=16.
CSS Toys for Professional Web Developers, Advanced CSS Design Resources—last-child.com, Oct. 16, 2007, pp. 1-5, http://www.last-child.com/add-opensearch-to-your-web-site/.

* cited by examiner

*Primary Examiner* — Mohammad Ali
*Assistant Examiner* — Thuy (Tiffany) Bui
(74) *Attorney, Agent, or Firm* — Shook, Hardy & Bacon L.L.P.

(57) ABSTRACT

Computer-readable media, systems, and methods for enabling a rich client search experience. In embodiments, a description is received from a data store. The description includes fields of information existing on the data store that are capable of being searched. A user interface is built based on the description and the user interface provides a user with a mechanism for searching the data store. And the user interface is presented to the user. The description is definable by the data store using a data-driven extension, allowing the data store to express schema and query capability information to a client and allowing the client to dynamically customize the user interface based upon the schema and query capability information expressed by the data store.

13 Claims, 5 Drawing Sheets

RICH CLIENT SEARCH EXPERIENCE

BACKGROUND

Often data stores include an enhanced, if not altogether sophisticated, configuration that generally goes unused by clients performing searches. For instance, where an operating system or an application is attempting to search a particular data store, without knowledge of the data store's structure, a simple text search is the only available approach. The simple text search does not consider, because it does not know, that the data store may have a number of fields available for more particularized searching. Also, the simple text search does not contemplate a federated organization in which many data stores may be searched in a seamless fashion. Traditionally, the simple text search is used because the operating system or application has no way of discerning the structure of various data stores. And the data stores have no way to communicate their structure for use by the operating system or application. The user is thus relegated to a simple and unsophisticated searching mechanism for data stores that does not take advantage of particular data stores' schema.

SUMMARY

Embodiments of the present invention provide computer-readable media, systems, and methods for enabling a rich client search experience. In embodiments, a description is received from a data store. The description includes fields of information existing on the data store that are capable of being searched. A user interface is built based on the description and the user interface provides a user with a mechanism for searching the data store. And the user interface is presented to the user. The description is definable by the data store using a data-driven extension, allowing the data store to express schema and query capability information to a client and allowing the client to dynamically customize the user interface based upon the schema and query capability information expressed by the data store.

It should be noted that this Summary is provided to generally introduce the reader to one or more select concepts described below in the Detailed Description in a simplified form. This Summary is not intended to identify key and/or required features of the claimed subject matter, nor is it intended to be used as an aid in determining the scope of the claimed subject matter.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1:
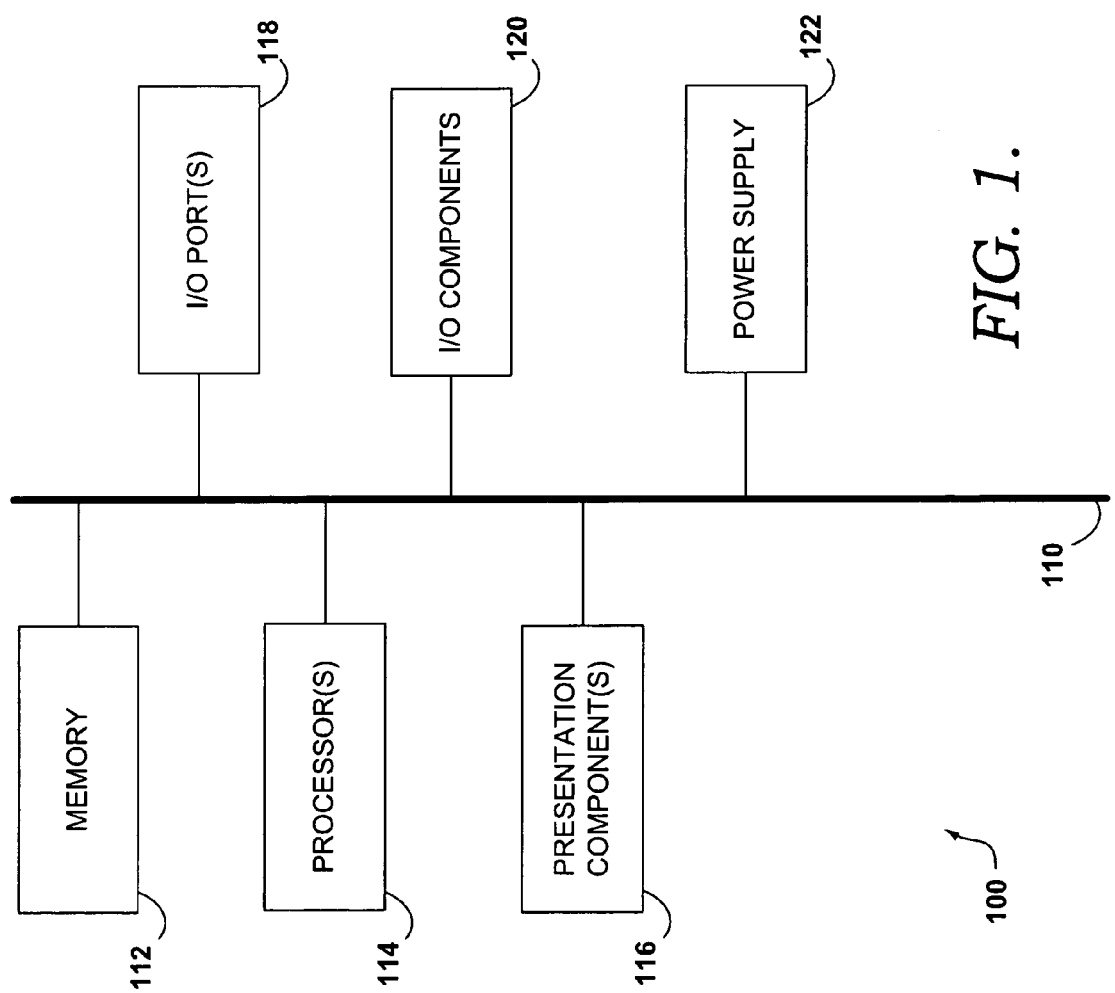
FIG. 1 is a block diagram of an exemplary computing system environment suitable for use in implementing the present invention.

The subject matter of the present invention is described with specificity herein to meet statutory requirements. However, the description itself is not intended to limit the scope of the patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of the individual steps is explicitly described.

Embodiments of the present invention provide computer-readable media, systems, and methods for enabling a rich client search experience. In embodiments, a description is received from a data store and the description includes fields of information existing on the data store that are capable of being searched. Also, a user interface is built based on the description. The user interface provides a user with a mechanism for searching the data store. Further, the interface is presented to the user. The description is definable by the data store using a data-driven extension, allowing the data store to express schema and query capability information to a client and allowing the client to dynamically customize the user interface based upon the schema and query capability information expressed by the data store. As used herein, the term "data store" is intended to be broadly defined, including online service providers (e.g. email, photo sharing, video sharing, news sites, webblogs, news sharing, social networking, etc.), traditional search engines (e.g. MS Live Search, etc.), and other search sites (e.g., auctions, books, hotels, airfares, music, etc.). Thus, as will be understood and appreciated by those having skill in the art, it is contemplated and within the scope of the present invention that the term "data store" be construed to include various types of online search and service sites.

Accordingly, in one aspect, the present invention is directed to one or more computer-readable media having computer-executable instructions embodied thereon for performing a method for enabling a rich client search experience. The method includes receiving a description from a data store. The description includes fields of information existing on the data store that are capable of being searched. The method further includes building a user interface based on the description. The user interface provides the user with a mechanism for searching the data store. And further, the method includes presenting the user interface to the user. In this aspect, the description is definable by the data store using a data-driven extension, allowing the data store to express schema and query capability information to a client and allowing the client to dynamically customize the user interface based upon the schema and query capability information expressed by the data store.

In another aspect, the present invention is directed to a computerized system for enabling a rich client search experience. The system includes a description receiving component configured to receive a description from a data store where the description includes fields of information existing on the data store that are capable of being searched. The system also includes a building component configured to build a user interface based on the description where the user interface provides a user with a mechanism for searching the data store. Further, the system includes a presenting component configured to present the user interface to the user, a query receiving component configured to receive a query from a client utilizing the user interface, a submitting component configured to submit the query to the data store, and a database for storing information associated with the rich client search experience. In this aspect, the description is definable by the data store using a data-driven extension, allowing the data store to express schema and query capability information to the client and allowing the client to dynamically customize the user interface based upon the schema and query capability information expressed by the data store.

In yet another aspect, the present invention is directed to one or more computer-readable media having computer-executable instructions embodied thereon for performing a method for enabling a rich client search experience. The method includes receiving a description from a data store. The description include fields of information existing on the data store that are capable of being searched, values associated with the fields of information, and actions capable of being performed to information stored on the data store. The method further includes building a user interface based on the description where the user interface providing a user with a mechanism for searching the data store and performing actions on information stored on the data store. Further, the method includes presenting the user interface to the user. In this aspect the description is definable by the data store using a data-driven extension, allowing the data store to express schema and query capability information to a client and allowing the client to dynamically customize the user interface based upon the schema and query capability information expressed by the data store.

Having briefly described an overview of embodiments of the present invention, an exemplary operating environment is described below.

Referring to the drawing figures in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

Embodiments of the present invention may be described in the general context of computer code or machine-usable instructions, including computer-executable instructions such as program modules, being executed by a computer or other machine, such as a personal data assistant or other handheld device. The phrase "computer-usable instructions" may be used herein to include the computer code and machine-usable instructions. Generally, program modules including routines, programs, objects, components, data structures, and the like, refer to code that performs particular tasks or implements particular abstract data types. Embodiments of the invention may be practiced in a variety of system configurations, including, but not limited to, hand-held devices, consumer electronics, general purpose computers, specialty computing devices, and the like. Embodiments of the invention may also be practiced in distributed computing environments where tasks are performed by remote processing devices that are linked through a communications network. In a distributed computing environment, program modules may be located in association with both local and remote computer storage media including memory storage devices. The computer useable instructions form an interface to allow a computer to react according to a source of input. The instructions cooperate with other code segments to initiate a variety of tasks in response to data received in conjunction with the source of the received data.

Computing device 100 includes a bus 110 that directly or indirectly couples the following elements: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. Thus, it should be noted that the diagram of FIG. 1 is merely illustrative of an exemplary computing device that may be used in connection with one or more embodiments of the present invention. Distinction is not made between such categories as "workstation," "server," "laptop," "hand held device," etc., as all are contemplated within the scope of FIG. 1 and reference to the term "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, or any other medium that can be used to encode desired information and be accessed by computing device 100.

Memory 112 includes computer storage media in the form of volatile and/or nonvolatile memory. The memory may be removable, nonremovable, or a combination thereof. Exemplary hardware devices include solid state memory, hard drives, optical disc drives, and the like. Computing device 100 includes one or more processors that read from various entities such as memory 112 or I/O components 120. Presentation component(s) 116 present data indications to a user or other device. Exemplary presentation components include a display device, speaker, printing component, vibrating component, and the like.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
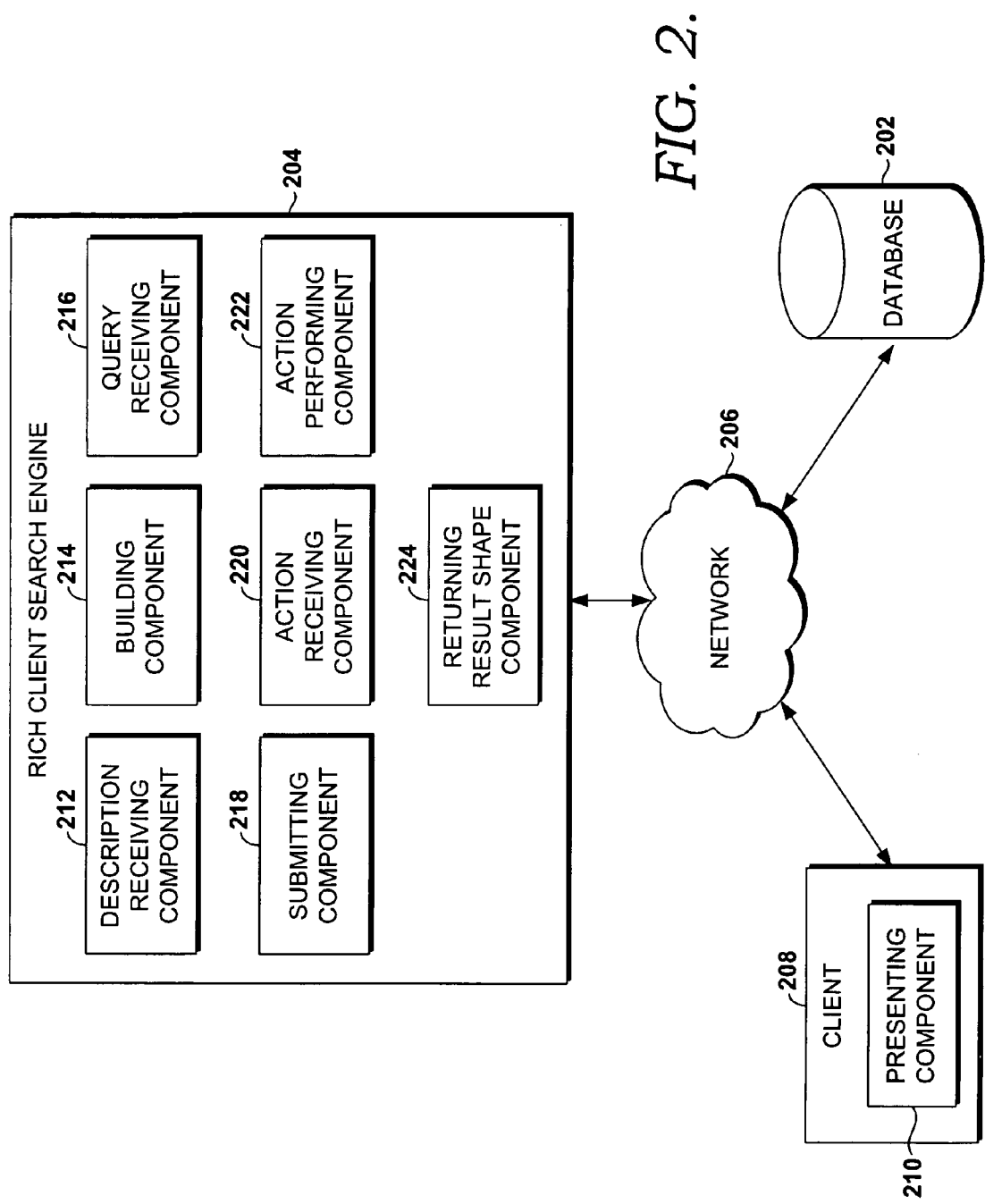
FIG. 2 is a block diagram illustrating an exemplary system for enabling a rich client search experience, in accordance with an embodiment of the present invention.

Turning now to FIG. 2, a block diagram is provided illustrating an exemplary system 200 for enabling a rich client search experience, in accordance with an embodiment of the present invention. System 200 includes a database 202, a rich client search engine 204, and a client 208, in communication with one another via a network 206. Network 206 may include, without limitation, one or more local area networks (LANs) and/or wide area networks (WANs). Such networking environments are commonplace in offices, enterprise-wide computer networks, and the Internet. Accordingly, network 206 is not further described herein.

Before engaging in a discussion of the details of the rich client search environment, an exemplary overview discussion of rich client search, including obtaining information from data stores and using the information to create interfaces, will be presented to help illustrate the overall functionality of system 200 in various embodiments. Rich client search allows users to discover the schema that a source can return and in embodiments rich client search may allow the user to request properties of the data store or sort the presentation of results. But typically, a simple keyword search is the mechanism used for accessing information on the data store. The simple keyword search is inefficient because it does not take advantage of the various schema and properties the data store may have available. Stated differently, many data stores have a lot more structure than what is typically being used but there is no effective way for the client to discern what the structure is and how to use it. For instance, assume the data store sells books and assume the client is seeking a book from Mark Twain. It would be much more efficient for the client to search the author field for "Mark Twain" rather than just performing a simple text search. A simple text search may produce a number of unintended results, such as books about Mark Twain. This simple but illustrative example shows the inefficiencies associated with an untargeted and/or constrained keyword search. In other words, relevancy is increased where the search is restricted to a subset of fields directed to the actual content the user is seeking.

Of course, many data stores, such as a book selling website, may allow a user surfing the Internet to directly access the site and enter the search by available fields. But embodiments of the present invention contemplate a client other than the brute force method of typing a web address into a browser and directly accessing it the site. Instead, in embodiments, the client provides a dynamic user interface that is tailored during execution to the user's interests based on what the user is seeking. Without rich client search, there are two alternatives, neither of which are efficient. The client could either provide a plain text search or create a unique user interface for each known data store—which is inefficient because of the vast number of data stores and because data stores may change and this rigid structure would require a new interface for every change. With rich client search, robust searches are available and dynamic interfaces are enabled. For instance, in embodiments, the client may run directly on the operating system, providing the user with a search tool that is configurable based on the data store that the user is searching. If the user is searching for books, the operating system (or an application running thereon) may go to a book data store, request the schema of the data store (e.g. properties, types of information, actions, even authentication, where applicable) and then build a user interface specifically for that data store. Here, the data store being a book data store, the operating system may build a user interface that presents the user with a number of available fields (e.g. author, title, publisher, etc.). In another example, perhaps the user is seeking airline tickets. The operating system (or, again, an application running thereon) will request information from an airline data store. In embodiments, the user will indicate to the operating system or application which data store to use. For instance, the user may indicate that Expedia is desired. In other embodiments, however, the user may simply indicate that travel is desired and the operating system or application will access a travel site. In the travel example, a user interface may be built that includes fields for departure city, destination city, dates, times, etc. Thus, rich client search provides for a configurable and dynamic user interface on the client side that allows the user to access the schema associated with the data store.

In various embodiments the data store may also indicate particular values that are available for the fields. For instance, where the data store is an airfare search, the values for the dates might be known and described along with the field date. Thus, the user interface may be able to include, along with the field for date, a drop-down menu providing a calendar of upcoming dates for travel. Or, where the data store is a book store, there may be a field for type and the drop-down values created by the user interface (although defined by the data store) may be hard-cover, soft-cover, or audio. In embodiments, a number of fields and values are contemplated because the fields and values, along with other information about the data store, are defined and described by the data store itself. Still further, embodiments of the present invention may also provide for complex search terms, as opposed to merely a free text search. Thus, the built user interface could provide a more complex search where the complex search terms are compatible with the data store.

In addition to providing for building user interfaces on the client side, rich client search also allows the data store to publish its information so that it may be efficiently used by various clients. In embodiments, the data store description is published using a data-driven extension. Using a data-driven model, the description is entirely configurable and can be defined and modified by the data store. For instance, imagine the data store changed its schema. It could simply change the data-driven extension describing its schema and when a client attempted to access the data store, the client would receive the updated description, allowing the client to build a tailored user interface based on the current schema. In embodiments of the present invention, this is accomplished using extensions to OpenSearch. For instance, extensions to OpenSearch may be based upon the Atom Syndication Format (Atom) and the Atom Publishing Protocol (APP). The extensions to OpenSearch protocol may be configured to add a set of extensions to Atom and APP that allow for rich interactions with a data store, including: browse, search, hierarchical collections, read/write access, optimized movies/copies/imports, advanced filtering/sorting/grouping, actions, structured items, optimistic concurrency (versioning), and item version enumeration and rollback. The protocol may also be configured to let back-end servers maintain compatibility with existing OpenSearch® clients such as web browsers. OpenSearch® clients may, in embodiments, ignore the extensions to OpenSearch® specific portions of the protocol. In embodiments, the format extends Atom Feed Format with new attributes for Atom links. These new relationship types allow the definition of the extra information for rich client search. For instance:

Xs:location
a link relationship to a location url
Xs:schema
a link relationship to a location schema file which defines properties/kinds/types and verbs.
Xs:authenticate
authentication mechanism to use
Xs:accept
the kinds of items a location has an affinity to
Xs:action(or verb)
links which act as canonical verbs
Xs:contents
a link relationship which is a url template defining how to enumerate the items in this location
<link rel="xs:add" xs:template="http://example.com/add-.aspx?id=(./id)"/>

| Name | Relationship | Type | Description |
| --- | --- | --- | --- |
| xs:searchTerms | xs:contents | String | Search terms and filters to pass to server. The query language used is assumed to be either free text or some level of AQS. The actual level of AQS used is determined by the schema. |
| xs:properties | xs:contents | String | Suggested list of properties to return when enumerating a collection. The property names come from the schema and should be comma (',') delimited (e.g. "System.Title, System.DateModified"). The server is free to return more properties then listed but at a minimum should include the listed properties in the entries it returns. |
| xs:orderBy | xs:contents | String | List of properties to order results by when enumerating a collection. Sort direction is indicated by prefixing a plus ('+') or minus ('−') in front of the name (e.g. "-System.DateModified" would return entries ordered by the DateModified in descending order. Multiple properties should be comma (',') delimited. |
| xs:groupBy | xs:contents | String | List of properties to group results by when enumerating a collection. Sort order should be taken from the xs:orderBy parameter. So a groupBy of "System.Author" with an orderBy of "System.Author,-System.DateModified," means to group by author ascending and then order the results in each group by descending DateModified. |
| xs:startIndex | xs:contents | Int | The index of the first <entry /> to return when enumerating a collection. Default value is the value of the xs:indexOffset attribute. |
| xs:count | xs:contents | Int | Number of entries to return when enumerating a collection. |
| xs:language | xs:contents | String | Local of xs:searchTerms value. Default value is "*". |

An exemplary location feed may be:

```
<?xml version="1.0" encoding="utf-8"?>
<feed xml:lang="en"
    xmlns="http://www.w3.org/2005/Atom"
    xmlns:xs="http://schema.microsoft.com/xmlstore/1.0">
  <id>stevenic/en-location.ldx</id>
  <title>My Example Location</title>
  <updated>2007-03-28T12:00:00Z</updated>
  <link rel="self" href="http://example.com/stevenic/en-location.ldx" />
  <link rel="xs:location" hreflang="ja" href="http://example.com/stevenic/ja-location.ldx" />
  <link rel="xs:location" hreflang="de" href="http://example.com/stevenic/de-location.ldx" />
  <link rel="xs:schema"
     type="application/ms-propdesc"
     href="http://example.com/en-schema.xml" />
  <link rel="xs:contents"
     type="application/atom+xml"
xs:template="http://example.com/stevenic/enum.aspx?l={xs:language?}&q={xs:filterBy?}&p={xs:properties?}&o={xs:orderBy?}&g={xs:groupBy?}&s={xs:startIndex?}&c={xs:count?}" />
  <link rel="xs:add" href="http://example.com/add.aspx?u=stevenic" />
  <link rel="xs:move" xs:template="http://example.com/stevenic/move.aspx?src={./id}" />
  <link rel="xs:copy" xs:template="http://example.com/stevenic/copy.aspx?src={./id}" />
  <link
rel="xs:import" xs:template="http://example.com/stevenic/import.aspx?url={./content[@src]}&type={./content[@type]?}" />
  <xs:accept>collection,image/*</xs:accept>
  <xs:authenticate>WSSE realm="foo", profile="UsernameToken"</xs:authenticate>
</feed>
```

This exemplary discussion of the OpenSearch® embodiment has been provided for illustrative purposes. But embodiments of the present invention are not limited to OpenSearch®. Instead, it is contemplated and within the scope of the present invention that other data-driven extensions may be used to enable a data store to publish description information and to enable a client to build a user interfaced based on the received description.

Once the rich client search experience has been established using the techniques described herein, embodiments of the present invention further contemplate even more enrichment of a client search experience. For instance, in embodiments, the client may search multiple data stores. As described above, the description is entirely configurable by the data store itself and the client does not control that description. But where multiple data stores choose to use similar properties, the client will be able to build an interface that accesses these multiple data stores. For instance, assume three music data stores all choose to include the property "music." And further assume that the user wants the client to search for music to purchase. The client may recognize that there are three available data stores with an identical property, build a user interface based on that property, and allow the user to simultaneously search all three data stores. In this example, it would be transparent to the user that three data stores are being searched. The user would merely indicate an interest in a music search and a user interface would be presented facilitating that search. Thus, embodiments of the present invention also enable federation of various data stores in a seamless whole. The federation may be on the client or using an intermediate service (either local or remote).

Because the data-driven extension allows the data store to describe itself, embodiments of the present invention include efficiencies other than those just directed to the user interface build. For instance, when the user interface accepts the query from the user and presents the query back to the data store, the user interface may also include information regarding how the data store should return the results. In other words, the user can define the shape of the results received from the data store based on the description received from the data store. Using the book data store example, the user could request the following: property1 (type)=audio book; property2 (author)=Mark Twain; property3 (title)=[blank]; shape→col1=title; col2=author; col3=type; sort=title. This simple example shows that the user could request the data store to return a shape of results that has three columns, title, author, and type. And, in this example, the user has indicated that the columns should be organized by title.

In yet another example, in embodiments, the schema defined by the data store may allow the user to take actions on an item on the actual data store itself using an customized interface presented by the operating system or application. For instance, assuming the data store is a photo sharing website, and assuming the user wants to log in to his own personal space on the site. The data store may publish a description of logon information and that may be included in the built user interface, allowing the user to login through the customized interface. Even further, once the user receives access to his information, the schema provided by the data store may describe how to take actions on the data. For instance, using the customized interface, the user may be able to modify or delete photos he has shared. In embodiments, the available modifications may be based upon the permissions associated with the user for an item that is returned. Thus, using the standardized data-driven extension, the user can access a data store, search a data store, describe the shape of information presented from the data store, and even take actions on information stored in the data store, using an interface built based on the data store's own description. Thus, various embodiments of the present invention provide a data-driven user interface that is not aware of the underlying schema of a data store prior to accessing the data store, nor is the user interface aware of the actions possible on a given item in the data store. Thus, not only is the user interface dynamic for constraints and shape, but also the user interface includes, in various embodiments, extensible actions. For instance, referring back to the book example, the book website may include the options to purchase a book or write a review about a book as available actions. Prior to accessing the data store, the user interface would not have been aware of the available actions, but the actions may be made available with the dynamic user interface.

Having provided an overview discussion of the rich client search environment, along with details of various embodiments, the exemplary system 200 will be discussed in more detail with regard to the functionality of the various components.

Database 202 is configured to store information associated with the rich client search environment. In various embodiments, such information may include, without limitation, user interface information, common data store descriptions, data store connection information, information regarding client communication with various data stores, and various other types of information that may be relevant to the rich client search environment. In various embodiments, database 202 is configured to be searchable so that the rich client search environment can readily access information in database 202. It will be understood and appreciated by those of ordinary skill in the art that the information stored in database 202 may be configurable and may include various information relevant to the rich client search environment. The content and/or volume of such information is not intended to limit the scope of embodiments of the present invention in any way. Further, though illustrated as a single, independent component, database 202 may, in fact, be a plurality of databases, for instance, a database cluster, portions of which may reside on a computing device associated with rich client search engine 204, associated with client 208, on another external computing device (not shown), or any combination thereof.

Client 208 may be a type of computing device, such as computing device 100 described with reference to FIG. 1, for example, and includes at least one presenting component 210. Presenting component 210 is configured to present (e.g. display) the user interface to the user. For example, without limitation, the user interface may be a tailored search tool, allowing the user to interact with a data store in a rich way because the user interface (in conjunction with, e.g., rich client search engine 204) may have access to information specific to the data store and information regarding access to the data store.

Rich client search engine 204 may be a type of computing device such as computing device 100 described with reference to FIG. 1, and includes a description receiving component 212, a building component 214, a query receiving component 216, a submitting component 218, an action receiving component 220, an action performing component 222, and a return result shape component 224. Although illustrated as separate and distinct components in system 200, rich client search engine 204 and client 208 may, in embodiments, reside on the same computing device. In other embodiments, portions of rich client search engine 204 may reside on client 208 and portions may reside on another computing device. In yet other embodiments, portions of rich client search engine 204 may reside on computing devices not shown in system 200.

Thus, the physical location of the various components of rich client search engine 204 may, in embodiments, be other than as illustrated. The illustration is intended for descriptive purposes to facilitate explanation of the functionality of various embodiments of the present invention.

Description receiving component 212 is configured to receive a description from a data store where the description includes fields of information existing on the data store that are capable of being searched. As discussed above, the fields for a book search may be fields such as author, title, etc. In embodiments, the book search will publish the fields using data-driven extensions and those fields will be received by description receiving component 212. As previously discussed, the description allows for a more effective search of the data store because the search is not limited to merely a simple text search.

Building component 214 is configured to build a user interface based on the description. In embodiments, the user interface provides the user with a mechanism for searching the data store. As previously discussed, the user interface may be built by the operating system of a computing device, such as computing device 100 of FIG. 1. The user interface will build based upon the data-driven extension information provided by various data stores. Thus, the user interface is unaware of the data store description until it accesses the data store and receives the data store's definition of its own schema and properties. For instance, where the user interface is built for a travel site, the interface might include a departure and destination location as well as drop-down menus for date information. Also, in various embodiments, many data stores may be accessed by the user interface. For instance, where the user interface is a text search, searching information stored on the client computer, embodiments of the present invention may also allow for searching of an online email account. Stated differently, in addition to information about the client device, building component 214 is able to create a user interface that also searches an online email account because the description of that data store has been received by description receiving component 212. Thus, the federated search environment can even include local data.

Query receiving component 216 is configured to receive a query from a client utilizing the interface. For instance, once the user interface has been built and presented to the user, in embodiments, the user interface will accept queries from the user. As previously discussed, the queries could range in scope from a simple text search of a number of federated data stores, to a specific field search based on fields available on particular data stores. The query could also include, in embodiments, a selection of values presented on a drop-down menu.

Submitting component 218 is configured to submit the query to the data store. Based on the information the data store has described, the user interface is aware of the type of information the data store accepts as queries. For instance, where the data store has described an author field for a book search, the user interface is aware of this and can thus submit a query term for the author field (which will have been represented on the user interface to the user). Additionally, because the user interface and the rich client search has knowledge of the structure of the data store, submitting component 218 may also be configured to submit the shape that the user wants the results returned in, as previously discussed. In that regard, return result shape component 224 is configured to define, based upon the schema and query capability information expressed by the data store, how results to the query should be displayed to the user.

Action receiving component 220 is configured to receive an instruction from the user to perform one or more actions on query results returned from the data store. For instance, as previously discussed, the results may be images the user has shared on an image sharing site. If the user wants to perform an action on those images, action receiving component 220 will receive that instruction from the user. Although actions have been discussed at various points herein with regard to image sharing websites, embodiments of the present invention are not limited to just the illustrative examples presented. For instance, it is contemplated and within the scope of the present invention that other actions may be available, e.g., actions on video sharing sites, webblogs, news sites, email, etc. Thus, embodiments of the present invention include various actions that may be performed on information in a data store. Once the instruction has been received, action performing component 222 is involved. Action performing component 222 is configured to submit actions to the data store. Stated differently, because the actions are actually performed on the information in the data store, and not just modified on the presentation of the data store with the user interface, the actions are submitted to the data store so that the data store can execute the action.

Figure 3:
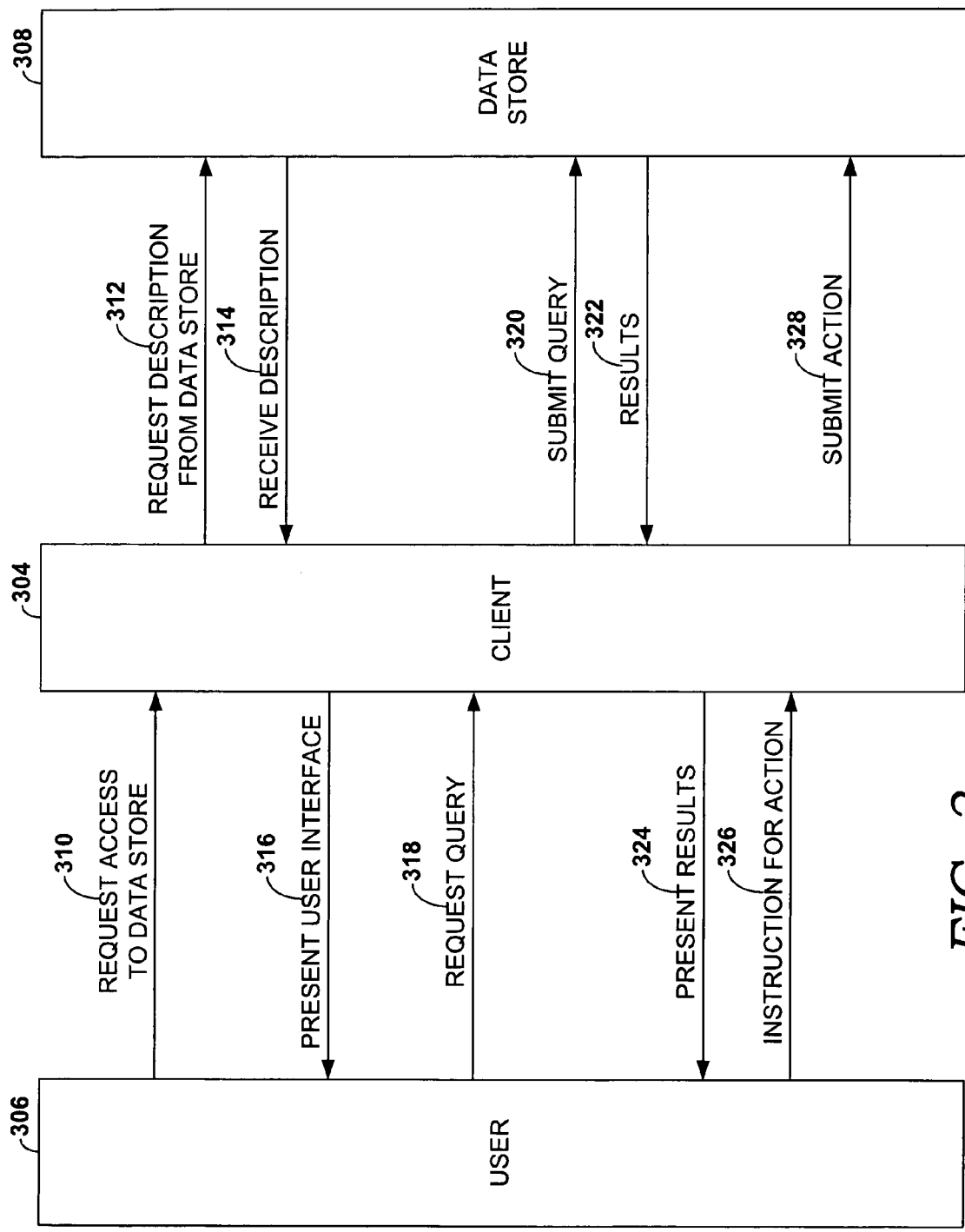
FIG. 3 is a block diagram illustrating an exemplary environment for enabling a rich client search experience, the environment illustrating exemplary communications between various parties for enabling a rich client search experience, in accordance with an embodiment of the present invention.

Turning now to FIG. 3, a block diagram is shown illustrating an exemplary environment for enabling a rich client search experience, the environment illustrating exemplary communications between various parties for enabling a rich client search experience, in accordance with an embodiment of the present invention. As shown, FIG. 3 provides an illustrative overview of the interaction between the various parties in a rich client search experience. Client 304 communicates with user 306 and data store 308 to provide the user with the rich search experience. Thus, as illustrated by numeral 310, user 306 requests access to data store 308 and, at numeral 312, client 304 requests a description from data store 308. As previously discussed, the description, in embodiments, uses data-driven extensions to provide schema and other information. Client 304 then receives the description from data store 308 as illustrated at numeral 314. As previously discussed, client 304 then builds a user interface based on the description received from data store 308 and presents the user interface to user 306 as shown at numeral 316.

User 306 then utilizes the user interface and requests a query, as illustrated at numeral 318. The query is submitted to data store 308 at numeral 322 and the results are returned to client 304 and displayed to user 306, as shown at 322 and 324. As previously discussed, in various embodiments the data store, such as data store 308, may have described the requirements for performing actions on information stored in the data store. Where actions are available, user 306 may submit an instruction for action to client 304 that, in turn, submits the action to data store 308. Data store 308 can then execute the action according to the instructions.

Figure 4:
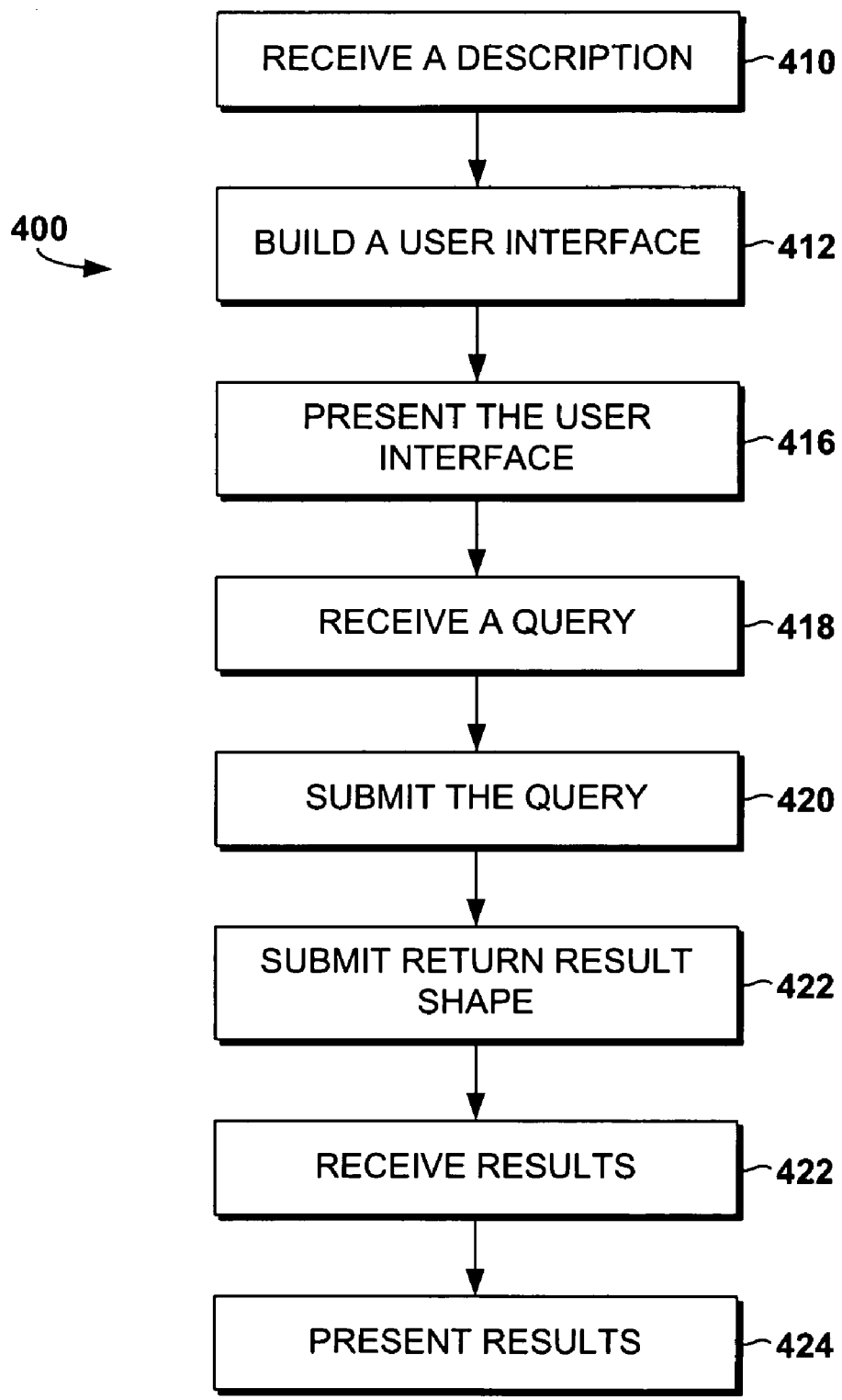
FIG. 4 is a flow diagram illustrating an exemplary method for enabling a rich client search experience, in accordance with an embodiment of the present invention.

Turning now to FIG. 4, a flow diagram of an exemplary method for enabling a rich client search experience, in accordance with an embodiment of the present invention, is illustrated and designated generally as reference numeral 400. Initially, as indicated at step 410, a description is received, e.g., by description receiving component 212 of FIG. 2 from a data store, e.g. data store 308 of FIG. 3. As previously discussed, the description is used to build a user interface, e.g., with building component 214 of FIG. 2, as illustrated at step 412 and that user interface is presented to the user as illustrated at step 416, e.g., with presenting component 210 of FIG. 2. At step 418, a query is received, e.g. using query receiving component 216 of FIG. 2, and the query is submitted to the data store using, e.g., submitting component 218 of FIG. 2, as illustrated at step 420. In embodiments, the user and/or the client may also define the return result shape that is received from the data store, and that shape may be submitted to the data store as illustrated at step 422, e.g., using submitting component 218 of FIG. 2. In embodiments, results are received from the data store and the results are presented to the user, as illustrated at steps 422 and 424.

Figure 5:
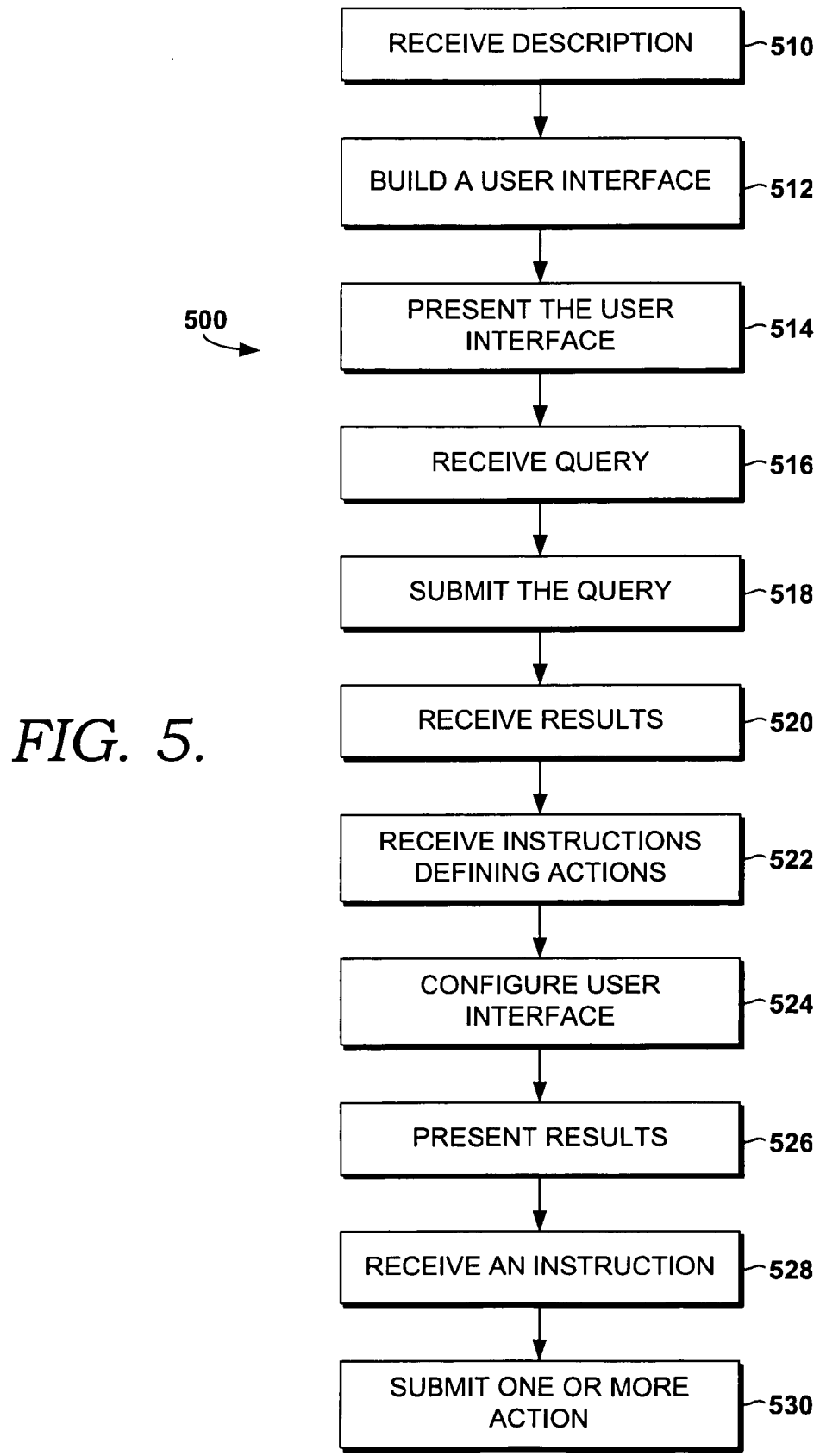
FIG. 5 is a flow diagram illustrating another exemplary method for enabling a rich client search experience, in accordance with another embodiment of the present invention.

Turning now to FIG. 5, a flow diagram of another exemplary method for enabling a rich client search experience, in accordance with an embodiment of the present invention, is illustrated and designated generally as reference numeral 500. A description is received, a user interface is built and presented to the user, a query is received and submitted, and results are received, as illustrated in steps 510-520, as previously discussed with reference to FIG. 4. As previously discussed, in embodiments, the data store may define actions that may be taken on information in the data store, in addition to describing the schema and other information associated with the data store. In embodiments, the instructions defining actions that may be taken are received at step 522, e.g., by action receiving component 220 of FIG. 2. Depending upon the type of action, the user interface may, in embodiments, be reconfigured to facilitate the user performing actions, as illustrated at step 524. The results are presented to the user at step 528 as previously discussed but, in embodiments, the user interface may include opportunities for the user to take action. For instance, referring again to the image sharing site, the action may be presented to the user when the user right-clicks on a particular image. By way of example, a menu may appear allow the user to rotate, modify, or even delete the image. Where the user chooses to do so, the action will be submitted, as illustrated at step 530, to the data store so that the data store can ensure the execution of the action.

In each of the exemplary methods described herein, various combinations and permutations of the described blocks or steps may be present and additional steps may be added. Further, one or more of the described blocks or steps may be absent from various embodiments. It is contemplated and within the scope of the present invention that the combinations and permutations of the described exemplary methods, as well as any additional or absent steps, may occur. The various methods are herein described for exemplary purposes only and are in no way intended to limit the scope of the present invention.

The present invention has been described herein in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain the ends and objects set forth above, together with other advantages which are obvious and inherent to the methods, computer-readable media, and systems. It will be understood that certain features and sub-combinations are of utility and may be employed without reference to other features and sub-combinations. This is contemplated by and within the scope of the claims.

The invention claimed is:

1. A computerized system for enabling a rich client search experience, the system comprising: a plurality of hardware processors; and a memory storing computer executable instructions to implement:
   a description receiving component configured to receive a description from a data store prior to receiving a query from a client, the description including one or more fields of information existing on the data store that are capable of being searched;
   a building component configured to build a user interface based on the description, the user interface providing a user with a mechanism for searching the data store;
   a presenting component configured to present the user interface to the user;
   a query receiving component configured to receive the query from the client utilizing the user interface, wherein the query is received from the client after the description has been received from the data store and after the user interface has been presented to the user;
   a submitting component configured to submit the query to the data store;
   a database for storing information associated with the rich client search experience, wherein the description is definable by the data store using a data-driven extension, allowing the data store to express schema and query capability information to the client and allowing the client to dynamically customize the user interface based upon the schema and query capability information expressed by the data store;
   an action receiving component configured to receive an instruction from the user to perform one or more actions on query results returned from the data store;
   an action performing component configured to submit at least one of the one or more actions to the data store; and
   a return result shape component configured to define, based upon the schema and query capability information expressed by the data store, how results to the query should be displayed to the user.

2. One or more computer-readable storage device storing computer-executable instructions embodied thereon for performing a method for enabling a rich client search experience, the method comprising:
   receiving an indication of a user's interests for which the user would like to search;
   based on the user's interests, identifying one or more data stores to search;
   prior to receiving a query from a client,
      receiving a description from the one or more data stores, the description including:
         (i) one or more fields of information existing on the data store that are capable of being searched,
         (ii) one or more values associated with the one or more fields of information, and
         (iii) one or more actions capable of being performed to information stored on the data store,
      building a user interface that is specific to the one or more data stores based on the description, the user interface providing a user with a mechanism for searching the one or more data stores and performing actions on information stored on the one or more data store, and
      presenting the user interface to the user, wherein the description is definable by the one or more data stores using a data-driven extension that defines schema associated with the one or more data stores such that the data-driven extension is modified each time that the schema is changed, the data-driven extension allowing the one or more data stores to express schema and query capability information to a client and allowing the client to dynamically customize the user interface based upon the schema and query capability information expressed by the one or more data stores;

receiving the query from the client utilizing the user interface by way of the one or more fields of information existing on the one or more data stores that are capable of being searched;

submitting the query to the one or more data stores;

based on user input, submitting a return result shape to the one or more data stores, the return result shape defining, based upon the schema and query capability information expressed by the one or more data stores, how results to the query should be displayed to the user;

receiving one or more results in response to the query; and presenting the one or more results to the user, the one or more results presented based upon the return result shape.

3. The computer-readable storage device of claim 2, wherein the presenting the one or more results to the user comprises presenting the one or more results organized by column and sorted according to the return result shape.

4. The computer-readable storage device of claim 3, wherein the data-driven extension is dynamically modifiable by the data store, allowing the data store to update the data-driven extension upon changing the schema and query capability information.

5. The computer-readable storage device of claim 4, wherein the user interface is integrated with an application executing on the client.

6. The computer-readable storage device of claim 4, wherein the user interface is integrated with an operating system executing on the client.

7. The computer-readable storage device of claim 2, the method further comprising:

receiving one or more instructions defining invocation of the one or more actions; and configuring the user interface based on the one or more instructions defining invocation of the one or more actions.

8. The computer-readable storage device of claim 2, wherein the user interface enables the user to perform a subset of the one or more actions.

9. The computer-readable storage device of claim 2, wherein the method further comprises:

receiving an instruction from the user to perform at least one of the one or more actions on at least one of one or more search results; and submitting the at least one of the one or more actions to the data store.

10. The computer-readable storage device of claim 2, wherein the description includes one or more values associated with the one or more fields of information existing on the data store that are capable of being searched.

11. The computer-readable storage device of claim 2, wherein building the user interface based on the description comprises including a search category for each of the one or more fields of information.

12. The computer-readable storage device of claim 11, wherein the search category for each of the one or more fields of information includes a drop-down menu including the one or more values associated with the one or more fields of information.

13. The computer-readable storage device of claim 2, wherein receiving the description from the data store comprises receiving the description from multiple data stores, and wherein the description has been defined consistently be each of the multiple data stores using the data-driven extension, allowing the client to dynamically customize the user interface based on the description from multiple data stores and allowing the client to query the multiple data stores based on the consistently-defined descriptions.

* * * * *